United States Patent
Ichikawa

(10) Patent No.: US 8,036,770 B2
(45) Date of Patent: Oct. 11, 2011

(54) NUMERICAL CONTROL UNIT WITH SET AMOUNT OF EXECUTION

(75) Inventor: Tsuneaki Ichikawa, Niwa-gun (JP)

(73) Assignee: Okuma Corporation, Oguchi-cho (JP)

(*) Notice: Subject to any disclaimer, the term of this patent is extended or adjusted under 35 U.S.C. 154(b) by 586 days.

(21) Appl. No.: 12/098,090

(22) Filed: Apr. 4, 2008

(65) Prior Publication Data

US 2008/0249653 A1    Oct. 9, 2008

(30) Foreign Application Priority Data

Apr. 6, 2007  (JP) ................................. 2007-100256

(51) Int. Cl.
*G06F 19/00* (2011.01)
*G06F 9/44* (2006.01)

(52) U.S. Cl. .................. 700/189; 700/159; 712/245

(58) Field of Classification Search .................. 700/11, 700/23, 56, 61–64, 67–70, 159, 169, 170, 700/179, 186, 188, 189; 718/101; 712/32, 712/205–207, 214, 215, 226, 245
See application file for complete search history.

(56) References Cited

U.S. PATENT DOCUMENTS

| | | | | |
|---|---|---|---|---|
| 4,328,448 A | * | 5/1982 | Berenberg et al. | 318/561 |
| 4,591,968 A | * | 5/1986 | Nozawa et al. | 700/181 |
| 4,628,444 A | * | 12/1986 | Nozawa et al. | 700/83 |
| 4,943,905 A | * | 7/1990 | Iwagaya et al. | 700/7 |
| 4,949,025 A | * | 8/1990 | Iwagaya et al. | 318/569 |
| 5,528,506 A | * | 6/1996 | Yoshida et al. | 700/188 |
| 5,578,913 A | * | 11/1996 | Yasuda et al. | 318/569 |
| 6,317,646 B1 | * | 11/2001 | de Caussin et al. | 700/173 |
| 6,401,005 B1 | * | 6/2002 | Schwarz et al. | 700/159 |
| 6,606,535 B1 | * | 8/2003 | Hamamura et al. | 700/159 |
| 2002/0138171 A1 | * | 9/2002 | Fukutani | 700/188 |

FOREIGN PATENT DOCUMENTS

| | | |
|---|---|---|
| JP | 6-75615 | 3/1994 |
| JP | 2813079 | 8/1998 |

* cited by examiner

*Primary Examiner* — M. N. Von Buhr
(74) *Attorney, Agent, or Firm* — Nelson Mullins Riley & Scarborough LLP

(57) ABSTRACT

A numerical control apparatus with a single block function is provided including a start button (3), an execution amount setting unit (13), and a machining program execution controller (4). Once the amount of execution of the machining program to be executed by a single operation is set in the execution amount setting unit, the machining program execution controller (4) batch executes the blocks included in the set amount of execution upon a single operation, such as a depression, of the start button (3). Additionally, upon detecting a block including a non-cutting command or a command for abruptly changing a machining direction, the machining program execution controller (4) suspends the execution of the machining program as of that block and waits for the start button (3) to be depressed again.

9 Claims, 7 Drawing Sheets

NUMERICAL CONTROL UNIT WITH SET AMOUNT OF EXECUTION

FIELD OF THE INVENTION

The present invention relates to a numerical control apparatus that sequentially executes a series of blocks in a machining program by an operation, such as a depression, of its start means so as to control the operation of the driving mechanism of a machine tool.

BACKGROUND OF THE INVENTION

A conventional numerical control apparatus has been known that provides for the verification of a machining program and the execution of machining of work at the same time by using the single block functionality, which sequentially executes or runs a machining program one block after another by depression of its start means. For example, the conventional numerical control apparatus shown in FIG. 7 includes a single block switch 52 and a start button 53 on an operation panel 51, in which a single block mode is set when the single block switch 52 is on and a continuous machining mode is on when the single block switch 52 is off. The numerical control apparatus additionally includes a machining program execution controller 54, a machining program interpreter 55, an interpolator 56, and machining program storage 57. Upon depression of the start button 53, the machining program execution controller 54 operates the machining program interpreter 55 and the interpolator 56.

Then, the machining program interpreter 55 sequentially reads the block data in a work program WP (see FIG. 6) stored in the machining program storage 57, interprets, and transmits the operation commands included in that data to the interpolator 56. The interpolator 56 determines the travel distance for each control unit time based on the current tool position, the machining endpoint position in the operation command, the tool feed speed, and other relevant information. The interpolator 56 then generates a positional command for moving the tool from the current tool position by the travel distance for each control unit time and sends the positional command to a servo-driver 59. The servo-driver 59 controls the servomotor 60, which serves as the driving mechanism of the machine tool, so as to move the tool to the position designated in the command. As the interpolator 56 repeatedly generates positional commands until the machining program reaches the end, the tool smoothly travels, thus machining the work to the desired shape.

In the single block mode, once one block is executed, the machining program execution controller 54 suspends its operation, not executing the next block until after the operator depresses the start button 53. In the mean time, the operator determines whether or not to execute the next block based on various information and conditions, including but not limited to information about the machining in the current and next blocks shown on the display and input unit 61, the current tool position, the remaining travel distance to the final machining endpoint, the rotational speed of the main spindle, the tool number, and the coolant supply condition. Since this single block functionality allows the operator to verify the suitability of the machining program on a block-by-block basis, it provides the advantages of smoothly machining first articles in particular in a trouble free manner. Conversely, in the continuous machining mode, a single depression of the start button 53 causes a plurality of blocks to be executed continuously.

Various techniques have been proposed to allow for more efficient verification of machining programs in numerical control apparatuses with this type of single block functionality. For example, Japanese Patent No. 2813079 discloses the technology for showing in animation the machining to be performed in the next block on a display and input unit. Japanese Published Unexamined Patent Application No. H06-75615 discloses the technology for automatically executing a plurality of blocks one after another at regular time intervals.

Problems to be Solved by the Invention

In such a conventional numerical control apparatus, a single depression of the start button results in the execution of one block, thus requiring numerous button operations as the number of blocks increases. Moreover, in the case of a program for machining curved surfaces, which typically includes a series of numerous minute blocks, one depression results in only a small tool movement. This makes it extremely difficult and inefficient an operation to verify the suitability of the program.

SUMMARY OF THE INVENTION

One important object of the present invention, which has been made in view of the foregoing problems, is to provide a numerical control apparatus that allows simple and efficient verification of a machining program even if the program is one for machining curved surfaces, which typically includes a series of numerous minute blocks.
Means to Solve the Problems
In order to solve the above-identified problems, the present invention provides a numerical control apparatus for sequentially executing a series of blocks in a machining program by an operation of an start means so as to control the operation of a driving mechanism of a machine tool, the numerical control apparatus comprising an execution amount setting unit for setting an amount of execution of a machining program to be executed at one time and a machining program execution controller for batch executing the blocks included in the set amount of execution by a single operation of the start means.

The amount of execution of the machining program to be executed at one time may be, for example, the number of blocks to be executed by a single operation of the start means (such as a start button), the machining distance (the travel distance of the tool or the work) to be machined by a single operation of the start button, the machining time for a single operation of the start button, or any execution amount data that is amenable for numerical processing. In one aspect, for this purpose, a system may be adopted that allows an operator to enter such an amount of execution through a display and input unit that in turn sends it to the execution amount setting unit.

In another aspect of the invention, an alternative system may be adopted that includes in advance a command in the machining program that designates the beginning and the end of the range to be executed by a single operation such that the machining program execution controller can read that command and set in the execution amount setting unit the range designated by the command as the amount of execution.

In a still another aspect of the present invention, when detecting a block containing a non-cutting command in the machining program, the numerical control apparatus suspends the execution of the machining program as of that block and waits for the start means to be operated again.

Specifically, the non-cutting command may be any command not associated with cutting or machining of work, such as an S command for specifying or changing the rotational speed of the main spindle of the machine tool, an M command for specifying or changing the rotational direction of the main spindle, a T command for specifying or changing the tool, and a command for positioning the tool by rapid traverse. More specifically, when detecting a block containing such a non-cutting command, the machining program execution controller suspends the execution of all the remaining blocks including that block and waits for the start button to be depressed again. As for blocks that include cutting commands only, after batch processing all the blocks included in the set amount of execution, the machining program execution controller suspends the execution of the machining program and waits for the start button to be depressed again.

In a further aspect of the numerical control apparatus of the present invention, when detecting a block containing in the machining program a command for abruptly changing a machining direction, the machining program execution controller suspends the execution of the machining program as of that block and waits for the start means to be depressed again.

As used herein, the term "a command for abruptly changing a machining direction" refers to a positional command that causes an abrupt change in the machining direction. For example, such a positional command may be one that would create an angle in the tool path formed between two machining directions or the variation of the radius of curvature of the tool path that exceeds a threshold value if a series of blocks including this block are executed. Specifically, the machining program execution controller calculates an angle in the tool path formed between two machining directions or the variation of the radius of curvature of the tool path based on the positional commands in the series of blocks and determines that the machining program includes a command for abruptly changing a machining direction if the calculated value exceeds the threshold. Typically, threshold values are selected based on the suitability for the material of the work or the type of the tool and entered into the numerical control apparatus through a display and input unit to be sent to the execution amount setting unit. Alternatively, parameters representing such suitable threshold values may be included in the machining program in advance such that they can be read from the machining program and set in the execution amount setting unit.

In one aspect of the invention, the start means is a start button for causing the execution of program blocks when operated or depressed.

According to the present invention, the numerical control apparatus batch executes the blocks included in a set amount of execution by a single operation of an start means, thus reducing the number of operations of the start means. Moreover, the numerical control apparatus allows the tool or any element under the control of this unit to be moved a greater distance by a single operation of the start means. This provides an excellent advantage of more efficiently and easily performing a program check, especially in the case of a machining program including a series of numerous minute blocks.

Since the numerical control apparatus of the present invention, upon detecting a block containing a non-cutting command, suspends the execution of a machining program as of that block, a detailed check may be performed on the block data, especially immediately before and after changes in the machining conditions. As for the blocks that include cutting commands only, the numerical control apparatus of the present invention additionally provides for efficient batch processing of all the blocks included in the set mount of execution.

In addition, since the numerical control apparatus of the invention, upon detecting a block containing a command for abruptly changing a machining direction, suspends the execution of the machining program as of that block, it has the advantage of detecting a poor or defective connection between blocks before performing the actual machining of work.

BRIEF DESCRIPTION OF THE ATTACHED DRAWINGS

FIG. 6 shows a data structure of an exemplary machining program; and

DETAILED DESCRIPTION OF THE PREFERRED EMBODIMENTS OF THE INVENTION

Figure 1:
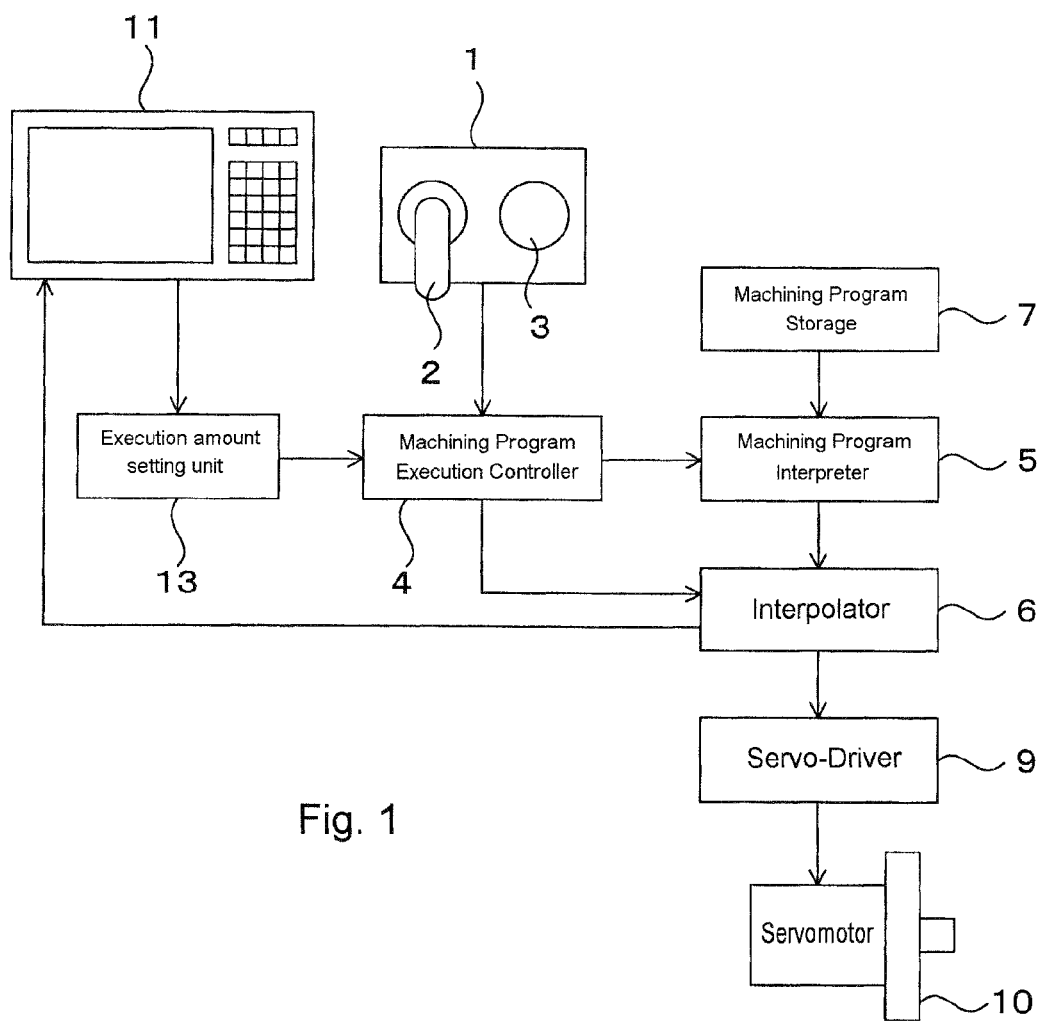
FIG. 1 shows a system configuration of a numerical control apparatus of the first embodiment of the present invention.
Figure 2:
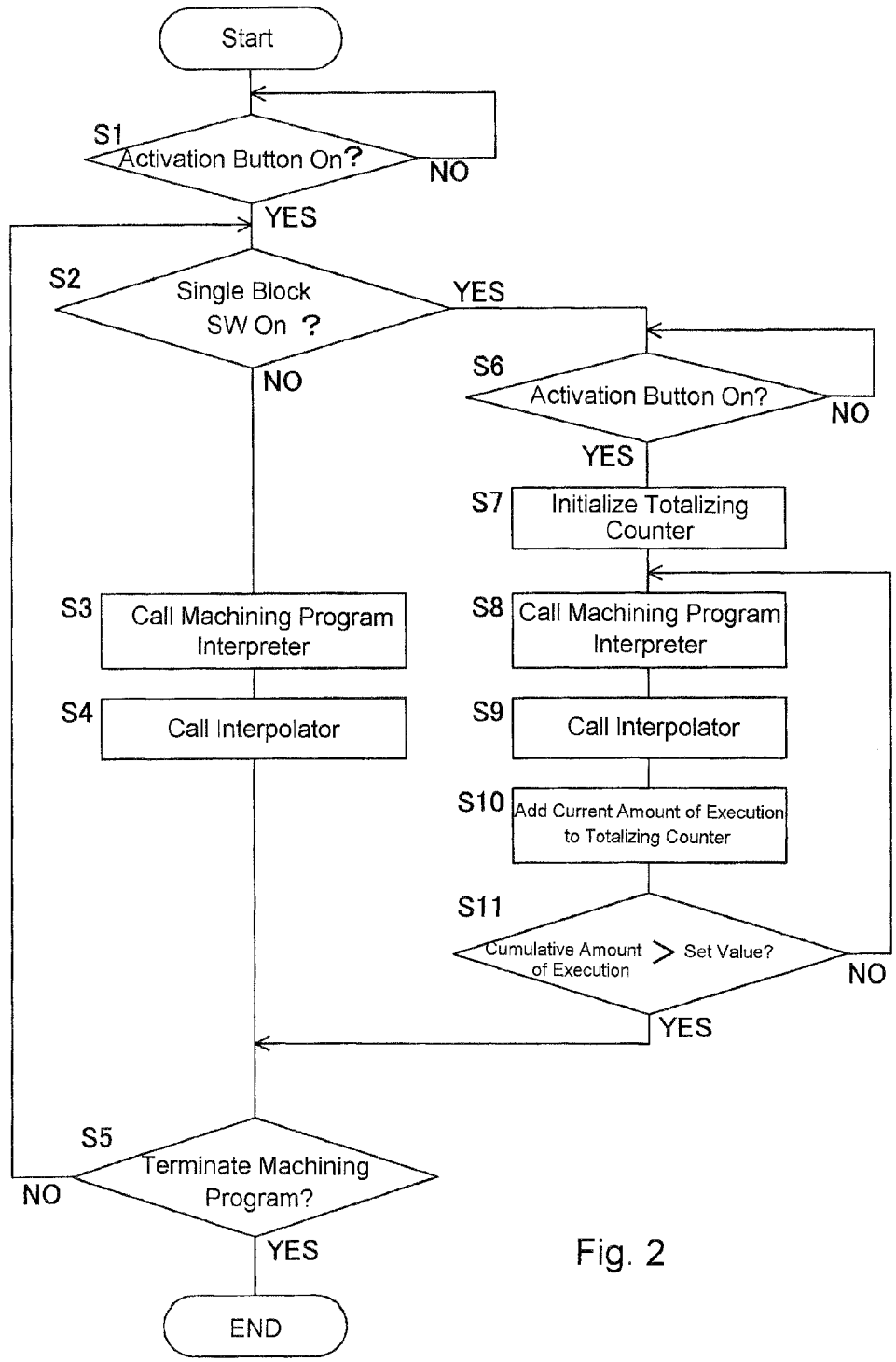
FIG. 2 is a flowchart outlining the operation of the numerical control apparatus shown in FIG. 1.
Figure 3:
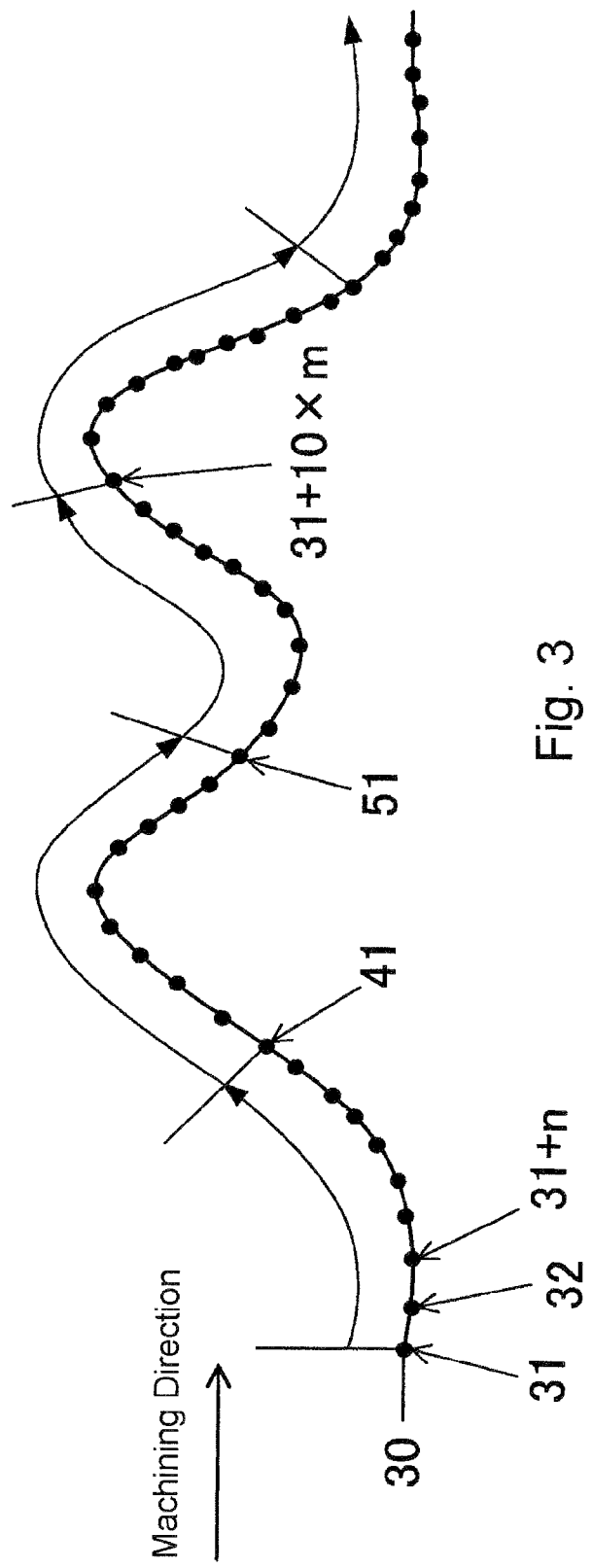
FIG. 3 is a schematic diagram showing a method of setting amounts of execution in a machining program.
Figure 4:
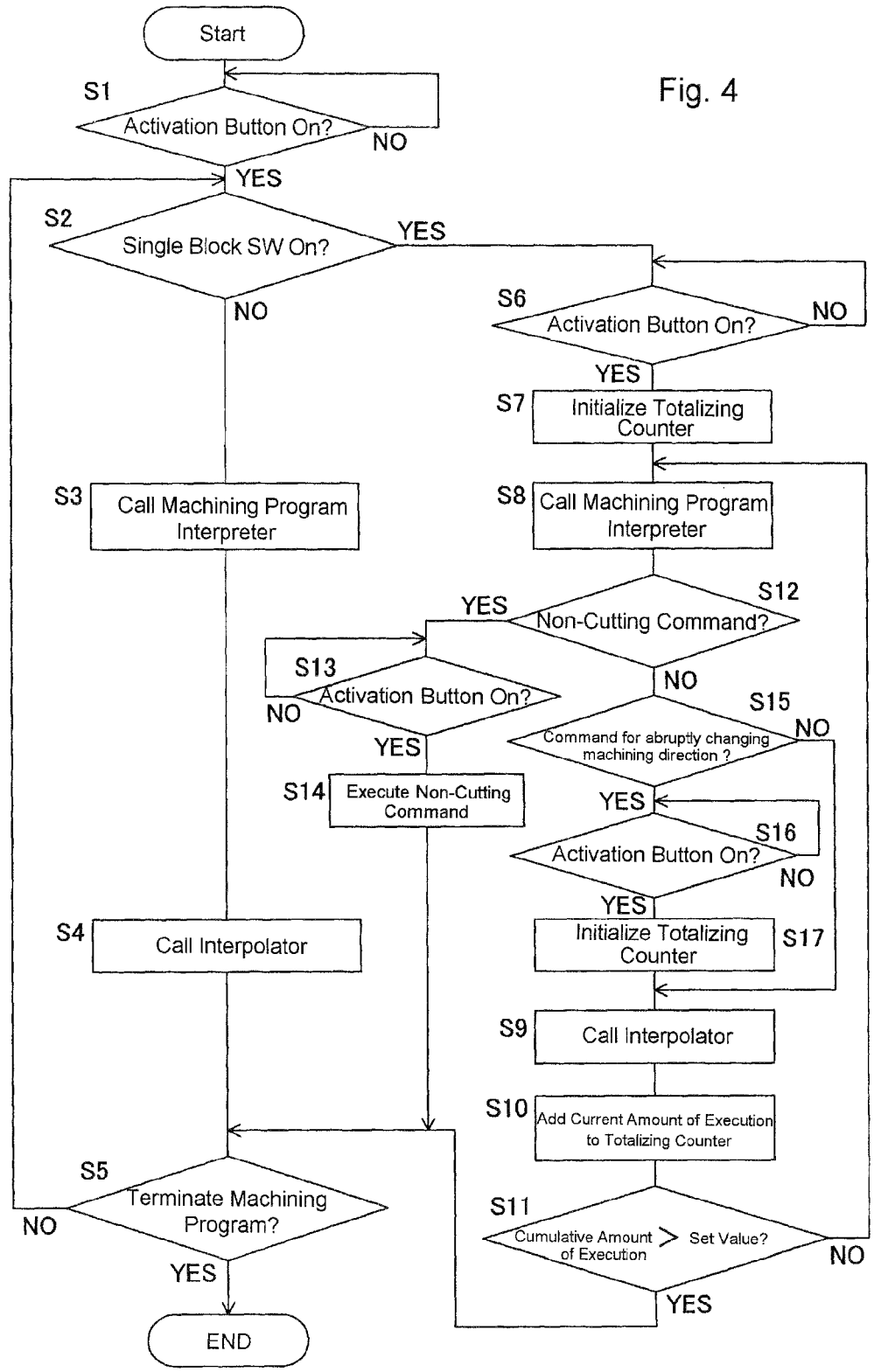
FIG. 4 is a flowchart outlining the operation of a numerical control apparatus of the second embodiment of the present invention.
Figure 5:
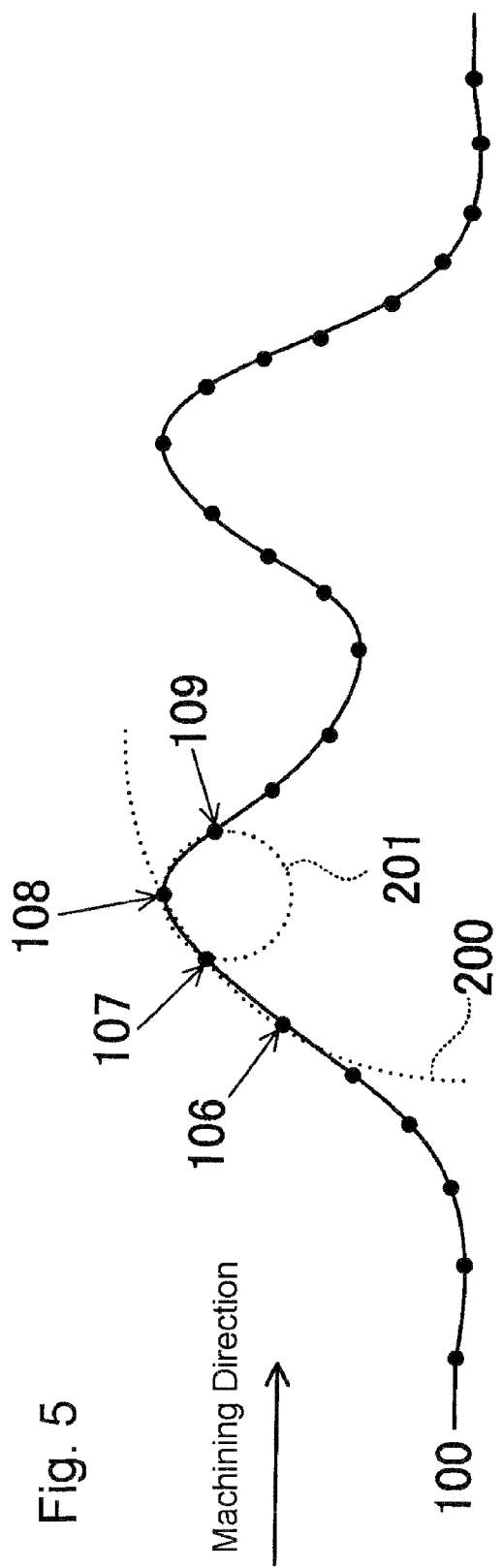
FIG. 5 is a schematic diagram showing a method for detecting a command for abruptly changing a machining direction in the numerical control apparatus shown in FIG. 4.
Figure 6:
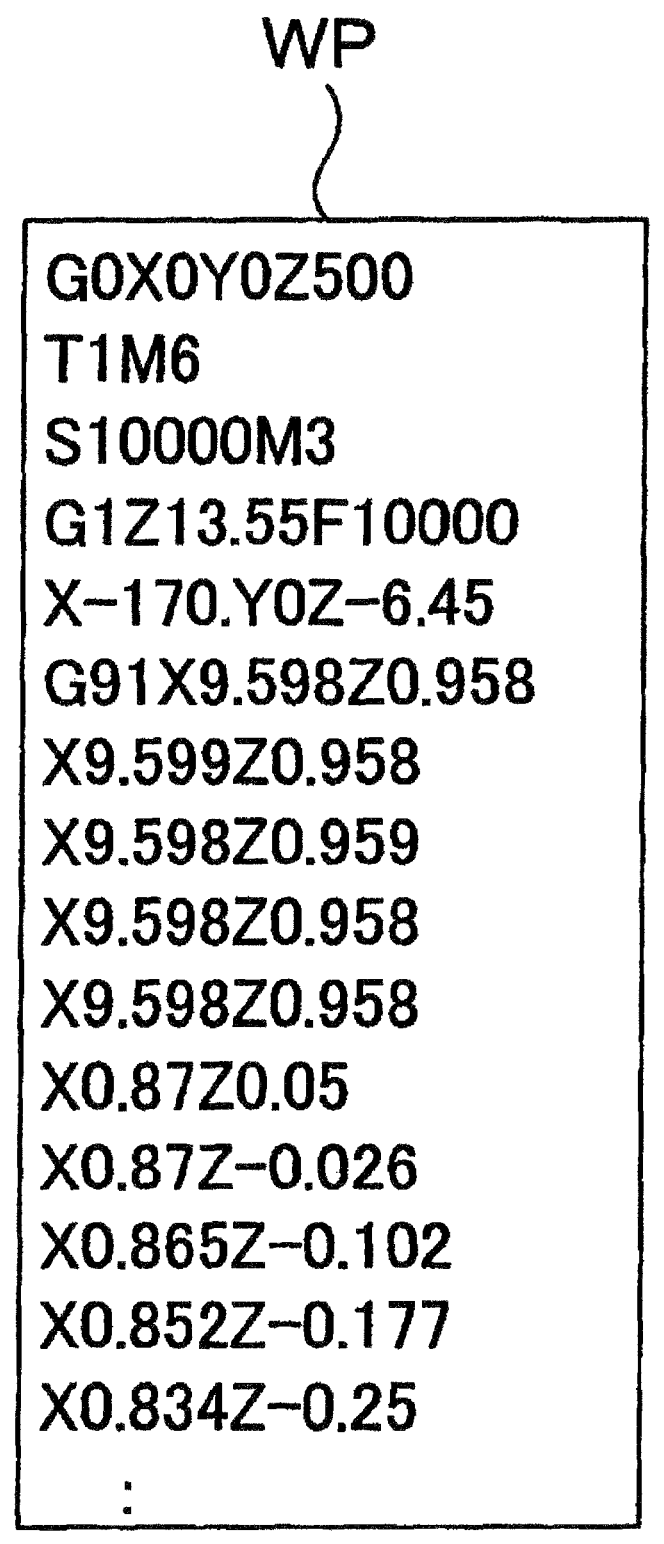
Figure 7:
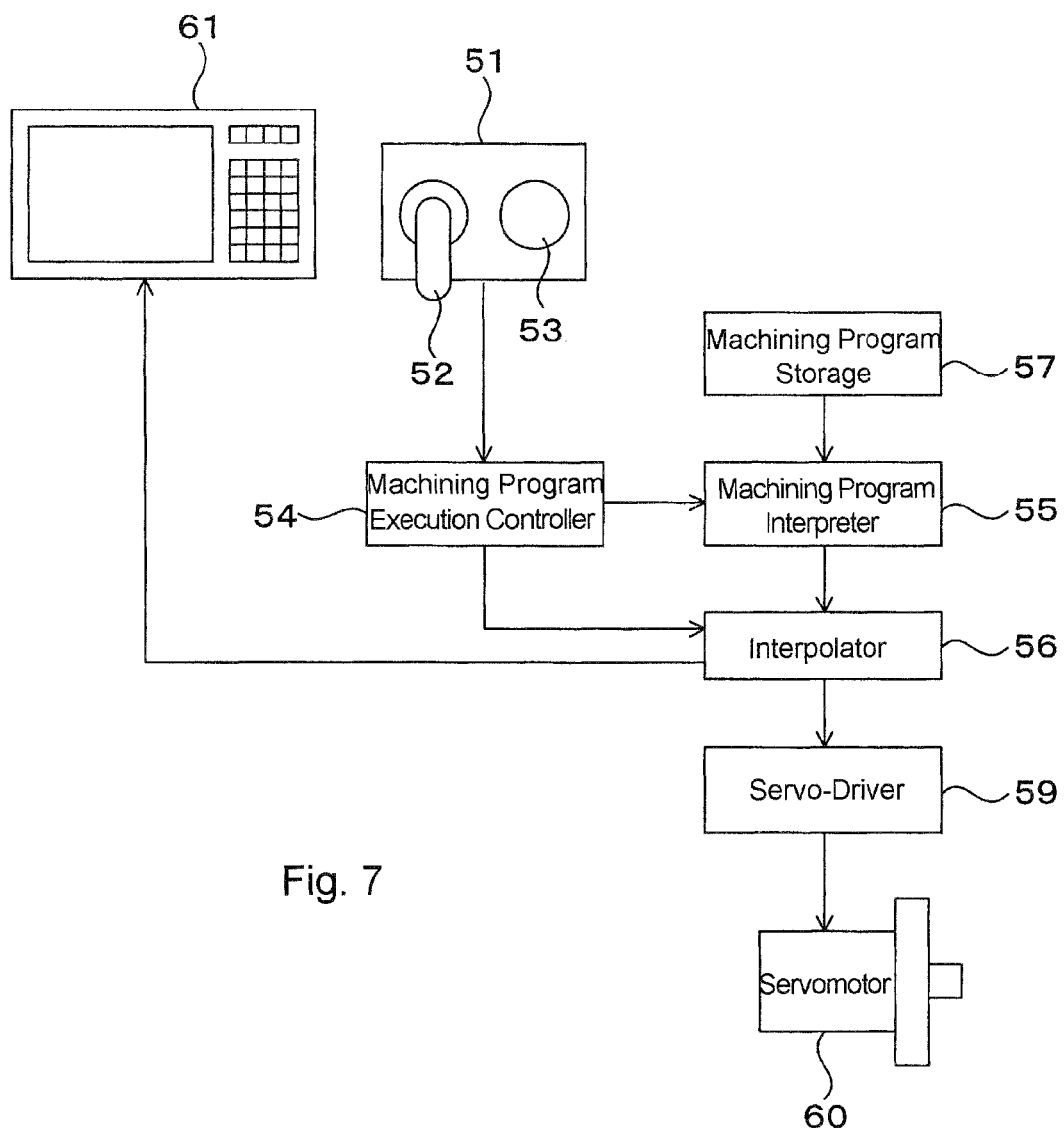
FIG. 7 shows a system configuration of a conventional numerical control apparatus.

Preferred embodiments of the present invention will be described hereinafter with specific reference to FIGS. 1-6. FIGS. 1-3 illustrate the first embodiment of the present invention, in which FIG. 1 shows the overall configuration of the numerical control apparatus, FIG. 2 schematically shows the operation of this numerical control apparatus, and FIG. 3 shows an exemplary method of setting amounts of execution in a machining program. FIGS. 4 and 5 illustrate the second embodiment of the present invention, in which FIG. 4 schematically shows the operation of this numerical control apparatus, and FIG. 3 shows an exemplary method of detecting a command for abruptly changing a machining direction in the numerical control apparatus. FIG. 6 shows an exemplary machining program executable by a numerical control apparatus. It should be noted that similar elements, operations, and processes are denoted by similar reference numerals throughout the various views.

Embodiment 1

As shown in FIG. 1, the numerical control apparatus according to the first embodiment, similar to conventional apparatuses, includes a single block switch 2 and an activation or start means, such as a start button 3, on an operation panel 1. The numerical control apparatus additionally includes a machining program execution controller 4, a machining program interpreter 5, an interpolator 6, and a machining program storage 7. When the start button 3 is depressed or otherwise operated with the numerical control apparatus placed in a single block mode, the machining program execution controller 4 causes the machining program interpreter 5 and the interpolator 6 to operate. Then the interpreter 5 sequentially reads the block data of a machining program WP (see FIG. 6) stored in the machining program storage 7 and the interpolator 6 generates required positional commands. Meanwhile, the servo-driver 9 controls the multi-axis servomotor 10 (i.e., the driving mechanism of the machine tool) to cause the tool to move smoothly to the positions designated in the commands, thus machining the work to the desired shape.

Additionally an execution amount setting unit 13 is coupled to the machining program execution controller 4. Set in the execution amount setting unit 13 are the number of blocks to be executed upon a single depression of the start button 3, the machining distance to be covered upon a single depression of the start button 3, the machining time for a single depression of the start button 3, or numerically processable execution amount data that combines any of the aforementioned data items. Also set in the execution amount setting unit 13 are parameters for detecting non-cutting commands in the machining program and threshold data for detecting commands for abruptly changing a machining direction in the machining program. Such data is entered into the display and input unit 11 by the operator and transmitted from the display and input unit 11 to the execution amount setting unit 13, where it is rewritably stored. Non-cutting commands and commands for abruptly changing a machining direction will be described in further detail in the second embodiment.

The following describes the manner of operation of the numerical control apparatus according to the preferred embodiment. In performing an actual machining check of the machining program, the machining program execution controller 4 initiates the system program schematically shown in FIG. 2, initially determining whether or not the start button 3 has been operated in Step S1. When the operator depresses the start button 3, the process determines in Step S2 whether or not the single block switch 2 has been operated. If it is determined that the switch 2 remains off, the continuous machining mode is established. If the switch 2 is on, the single block mode is established. In the continuous machining mode, similar to the conventional manner of operation, the machining program interpreter 5 interprets the operation command in the block data read out from the storage 7 in Step S3, and the interpolator 6 then generates a positional command based on information, such as the current tool position and the machining endpoint position in the operation command, in Step S4. In Step S5, it is determined whether the machining program should be continued or terminated. That is, in the continuous mode, a series of blocks are successively executed so as to machine the work to the desired shape until the exit code is detected in the machining program (Steps S2-S5).

In the single block mode, however, unlike the conventional manner of operation, the machining program execution controller 4, upon a single depression of the start button 3, batch-processes the block data corresponding to the amounts of execution set in the execution amount setting unit 13. At the beginning of the batch processing, the process determines in Step S6 whether or not the start button 3 has been operated or depressed, and if not, the process stands by until the start button 3 is depressed. Once the start button 3 is depressed, the totalizing counter is initialized in Step S7. The totalizing counter provides a means for accumulating the data representing the amount of execution (the number of blocks, the machining distance, the machining time, etc.) that has occurred after the start button 3 is depressed. The totalizing counter is implemented by the computing functionality of the machining program execution controller 4. In Steps S8 and S9, the machining program interpreter 5 and the interpolator 6, respectively, operate in the same manner as in the continuous machining mode, thus causing the tool to machine the work according to the data in a single block. Subsequently, the machining program execution controller 4 adds the execution amount of the current block from the executed operation command to the counter value of the totalizing counter in Step S10. In the following step, Step S11, it is determined whether or not the current cumulative amount of execution has exceeded the value set in the execution amount setting unit 13.

If the cumulative amount of execution has not exceeded the set value, the remaining block data is sequentially executed in Steps S8-S11. Conversely, if the cumulative amount of execution has exceeded the set value, it is determined in Step S5 whether there still is any block data to be executed in the machining program. If there is, after confirming that the operation continues in the single block mode in Step S2, the process stands by until the start button 3 is pushed down in Step S6. At the moment, the tool remains stationary in the machining endpoint position in the operation command included in the block at which the set value was exceeded. With the tool in the stationary state, the operator checks on the display and input unit the machining so far performed and the operation command in the next block and depresses the start button 3 if he is to continue the execution of the machining program. Once the start button 3 is depressed, in Steps S7 and subsequent steps, the machining program execution controller 4 recursively batch processes the block data corresponding to the amount of execution that has been set until all the blocks constituting the machining program are executed to confirm the termination of the machining program (i.e., YES in Step S5), thus terminating the process. It should be noted that the tool may be placed in the stationary state at other points in the process. One alternative approach is to (1) determine whether the execution of the next block will cause the cumulative amount of execution to exceed the set value, and if so, (2) suspend the execution of the next block and bring the tool to a halt in the machining endpoint position designated in the previous block.

As can be seen from the foregoing, according to the numerical control apparatus of this embodiment, a single depression of the start button 3 causes the plurality of blocks included in the amount of execution set by the operator to be batch-processed. This reduces the number of times the start button 3 needs to be operated and allows the tool to travel a greater distance per button operation, as compared to the conventional technology. For example, in the case of a program for machining curved surfaces comprising numerous minute blocks, as shown in FIG. 3, the conventional single-block mode operation would cause the tool to stop in each of the command positions 31, 32, 31+n . . . , thus requiring a switch depression between stops. According to the single block functionality of this embodiment, however, if the amount of execution at one time is set to ten blocks, the tool will come to a halt in command positions 31, 41, 51, 31+10× m, thereby dramatically reducing the frequency with which to depress the start button 3 and causing the tool to move a far greater distance for each button depression. This arrangement permits the operator to efficiently and easily check the suitability of the curved surface-machining program.

Embodiment 2

The second embodiment of the present invention will now be described with reference to FIGS. 4 and 5. The numerical control apparatus of the second embodiment is substantially identical to the system of the first embodiment (see FIG. 1). In this embodiment, however, if a block containing a non-cutting command or a command for abruptly changing a machining direction is encountered or detected in the single block mode, the execution of the machining program is suspended as of that block, not resuming the tool movement until after the start button 3 is depressed again. More particularly, as shown in the flowchart of FIG. 4, in Step S12, the machining program execution controller 4 determines whether or not the operation command that has been analyzed by the machining program interpreter 5 contains a non-cutting command, such as an S command for changing the rotational speed of the main spindle, an M command for changing the rotational direction of the main spindle, a T command for changing the tool, a command for positioning the tool by rapid traverse. If any such non-cutting command is detected, the process stands by until after the start button 3 is depressed (Step S13), bringing the tool to a halt in the machining endpoint position designated in the operation command in the previous block. Once the operator depresses the start button 3, in Step S14, the machining program execution controller 4 executes the non-cutting command, such as an S command, an M command, a T command, or the positioning command, as required. If no non-cutting command is detected in Step S12, the process goes on to Step S15, in which a determination is made whether a command for abruptly changing a machining direction is included.

To determine whether a command for abruptly changing a machining direction is encountered, for example, when the tool reaches the command position 108 on the machining curve 100 as shown in FIG. 5, the machining program execution controller 4 calculates the radius of the circle 201 tangential to three points, the command position 108 of the current block, the command position 107 of the previous block, and the command position 109 of the next block. In addition, the machining program execution controller 4 calculates the radius of the circle 200 tangential to three points, the command position 108, and the two previous command positions 106 and 107. The machining program execution controller 4 determines that the next block includes a command for abruptly changing a machining direction if the variation (i.e., difference) between the radii of the two circles exceeds the threshold value set in the execution amount setting unit 13. Alternatively, a determination that a command for abruptly changing a machining direction is included may be made if the distance between the centers of the two circles 200 and 201 exceeds a threshold. Still another approach is to calculate the angle formed between the line defined by the command position 108 of the current block and the command position 107 of the previous block and the line defined by the command position 108 of the current block and the command position 109 of the next block and determine that a command for abruptly changing a machining direction is included if this angle exceeds the threshold set in the execution amount setting unit 13.

Whichever manner of determination is used, if a command for abruptly changing a machining direction is detected in the next block, the machining program execution controller 4 remains in the standby mode until the start button 3 is depressed in Step S16, thus maintaining the tool in the command position 108. After the operator operates the start button 3, the machining program execution controller 4 initializes the totalizing counter in Step S17 and then the interpolator 6 executes interpolation of the block that includes a command for abruptly changing a machining direction in Step S9. Conversely, if neither a non-cutting command nor a command for abruptly changing a machining direction is detected, the process continues with the batch processing of blocks as in the first embodiment. Accordingly, the numerical control apparatus of the second embodiment suspends the execution of a machining program at a block containing a non-cutting command, allowing scrutiny of the block data for reversal of the rotational direction of the main spindle and replacement of the tool. As for the blocks that include cutting commands only, the numerical control apparatus of this embodiment additionally provides for efficient batch processing of all the blocks included in the amount of execution that has been set. Furthermore, the second embodiment of the present invention suspends the execution of a machining program at a block containing a command for abruptly changing a machining direction, which provides the additional advantage of easily detecting, prior to the actual machining of work, a poor or defective connection between blocks (e.g., a disconnection in a specific location, such as an edge or a fold in the work, or a discontinuity due to insufficient CAM precision) that would be found only after the actual machining in the conventional technology.

One of ordinary skill in the art will additionally appreciate that the above embodiments are only an illustration and not restrictive in any sense and that there are different ways to alter the parameters of the embodiments disclosed, such as the size, shape, or type of elements or materials, in a manner still in keeping with the spirit and scope of the present invention as set forth below. (1) A command may be included in the machining program to designate the beginning and the end of the range to be executed in a single run or by a single operation such that the machining program execution controller 4 can read that command from the machining program and set in the execution amount setting unit 13 the range designated by the command as the amount of execution. (2) The machining program may include a thresholds for evaluating angles of bends in the tool path (i.e., an angle formed between two machining directions) or the variation in the curvature radius of the tool path such that the machining program execution controller 4 can read that threshold from the machining program and set it in the execution amount setting unit 13. (3) Although the foregoing embodiments are described as applied to the type of machine tool that moves the tool, the control according to the first and/or second embodiment may be equally effectively applied to the type of machine tool where the table holding work moves with respect to the tool as well as the type that permits movement of the spindle head holding the tool and the work table with respect to each other.

What is claimed is:

1. A numerical control apparatus for, each time a start means is operated, interpreting data in a single block in a machining program, controlling the operation of a driving mechanism of a machine tool based on the operation command in the interpreted data in the single block, and, once processing of the data in the single block is completed, suspending further processing until the start means is operated again, the numerical control apparatus comprising, an execution amount setting unit for setting an amount of execution of a machining program to be executed at one time by a single operation of the start means and, a machining program execution controller for, regarding the data in each of the blocks included in the set amount of execution of the machining program to be executed upon a single operation of the start means, repeatedly executing control of the operation of the driving mechanism of the machine tool based on interpretation of the data in the block and the operation command in the interpreted data in the block, and, once processing of the data in all the blocks included in the set amount of execution is completed, suspending further processing until the start means is operated again.

2. A numerical control apparatus in accordance with claim 1, wherein the amount of execution of the machining program to be executed at one time is selected from the group consisting of the number of blocks to be executed by a single operation of the start means, the machining distance to be machined by a single operation of the start means, and the machining time for a single operation of the start means.

3. A numerical control apparatus in accordance with claim 1 further comprising a display and input unit for accepting and sending the amount of execution to the execution amount setting unit.

4. A numerical control apparatus in accordance with claim 1, wherein the machining program incorporates in advance a command that designates a beginning and an end of a range to be executed by the single operation so as to allow the machining program execution controller to read the command and to set in the execution amount setting unit the range designated by the command as the amount of execution.

5. A numerical control apparatus in accordance with claim 1, wherein when detecting a block containing a non-cutting command in the machining program, the machining program execution controller suspends the execution of the machining program as of that block and waits for the start means to be operated again.

6. A numerical control apparatus in accordance with claim 5, wherein the non-cutting command is selected from the group consisting of an S command for changing the rotational speed of the main spindle of the machine tool, an M command for changing the rotational direction of the main spindle, a T command for changing a tool, and a command for positioning the tool by rapid traverse.

7. A numerical control apparatus in accordance with claim 1, wherein when detecting a block containing in the machining program a command for abruptly changing a machining direction, the machining program execution controller suspends the execution of the machining program as of that block and waits for the start means to be operated again.

8. A numerical control apparatus in accordance with claim 7, wherein the machining program execution controller calculates one of an angle in a tool path formed between two machining directions and the variation of the radius of curvature of the tool path based on positional commands in the series of blocks and determines that the machining program includes a command for abruptly changing a machining direction if the calculated value exceeds the threshold.

9. A numerical control apparatus in accordance with claim 5, wherein the non-cutting command is selected from the group consisting of an S command for specifying the rotational speed of the main spindle of the machine tool, an M command for specifying the rotational direction of the main spindle, a T command for specifying a tool, and a command for positioning the tool by rapid traverse.

* * * * *